United States Patent [19]
Miyaoh

[11] Patent Number: 5,232,228
[45] Date of Patent: Aug. 3, 1993

[54] METHOD OF IDENTIFYING THICKNESS OF A GASKET AND A GASKET WITH A PLATE INFORMATION DEVICE

[75] Inventor: Yoshio Miyaoh, Tokyo, Japan

[73] Assignee: Ishikawa Gasket Co., Ltd., Tokyo, Japan

[21] Appl. No.: 887,489

[22] Filed: May 26, 1992

Related U.S. Application Data

[63] Continuation-in-part of Ser. No. 358,074, May 30, 1989, Pat. No. 5,141,237.

[30] Foreign Application Priority Data

May 29, 1991 [JP] Japan ............... 3-048363[U]

[51] Int. Cl.$^5$ ............................................. F16J 15/08
[52] U.S. Cl. .................................... 277/2; 277/9; 277/235 B; 29/407; 29/705; 29/904; 73/865.8
[58] Field of Search ............. 277/1, 2, 9, 235 B, 277/233, 234, 235 R, 236; 29/407, 464, 467, 705, 904; 73/865.8; 428/192, 571

[56] References Cited

U.S. PATENT DOCUMENTS

| | | |
|---|---|---|
| 2,864,909 | 12/1987 | Cobb . |
| 4,025,421 | 5/1977 | Mueller .................. 209/656 X |
| 4,648,607 | 3/1987 | Yamada et al. . |
| 4,752,190 | 6/1988 | Fry ........................ 29/407 X |
| 4,765,633 | 8/1988 | Hossack .................. 29/464 X |
| 4,776,601 | 10/1988 | Yamada .................. 277/235 B X |
| 4,810,454 | 3/1989 | Belter .................... 277/233 B X |
| 4,813,691 | 3/1989 | Schoenborn ............. 277/235 B |
| 5,083,801 | 1/1992 | Okano et al. ........... 277/235 B X |
| 5,095,867 | 3/1992 | Inawmura ............... 277/235 B X |
| 5,096,325 | 3/1992 | Udagawa ................ 277/235 B X |
| 5,141,237 | 8/1992 | Yamada et al. ......... 277/2 |
| 5,154,529 | 10/1992 | Udagawa et al. ....... 277/235 B X |

*Primary Examiner*—William A. Cuchlinski, Jr.
*Assistant Examiner*—Scott W. Cummings
*Attorney, Agent, or Firm*—Kanesaka and Takeuchi

[57] ABSTRACT

A metal laminate gasket with a plate information device is formed of at least one first metal plate and at least one second metal plate. The first metal plate is provided with at least one, preferably a plurality of, notches or holes inside the plate to constitute plate information area, and the second plate is provided with at least one, preferably, a plurality of, plate information signs, i.e. blocking portion or hole, at an area corresponding to the notch or hole. When the gasket formed of the first and second plates is identified, a checking device having at least one, preferably a plurality of, pins is used to find if the pin passes the plate information sign. Therefore, after the plates are assembled, the kind or thickness of the gasket can be easily identified.

8 Claims, 1 Drawing Sheet

METHOD OF IDENTIFYING THICKNESS OF A GASKET AND A GASKET WITH A PLATE INFORMATION DEVICE

CROSS REFERENCE TO RELATED APPLICATION

This is a continuation in part application of U.S. patent application Ser. No. 358,074 filed on May 30, 1989, now U.S. Pat. No. 5,141,237.

BACKGROUND OF THE INVENTION AND RELATED ART STATEMENT

The present invention relates to a method of identifying a thickness of a metal laminate gasket and a gasket with a plate information device, so that a kind or a thickness of a gasket is readily recognized after the gasket is assembled.

Recently, efficiency of an engine has been significantly improved. Since a top clearance between a piston at a top dead center and an inner top portion of a cylinder head affects power and exhaust gas of the engine, a required top clearance has been precisely examined and selected for a particular engine.

A top clearance is generally determined when an engine is designed. However, since a cylinder head gasket is installed between a cylinder head and a cylinder block, a precise adjustment of the top clearance is made by selecting the thickness of a cylinder head gasket.

On the other hand, when a new engine is developed, a huge amount of money is required. Therefore, in order to efficiently utilize the engines, the same engines are used for different models of cars. In this case, the engines are slightly modified to suit the respective models. The top clearance of the engine may be changed by adjusting the thickness of a gasket.

In a metal laminate gasket, the gasket is formed of a plurality of metal plates. When the thickness of the engine is changed for the reason as stated above, therefore, one of the metal plates with a certain thickness is changed to another plate with a different thickness. Thus, the gaskets with the different thicknesses are prepared for one type of the engine. In the same gasket, a plurality of plates with different thicknesses is prepared and selectively used according to the models of the cars.

Before a gasket is assembled, it is easy to identify or recognize the plates by making signs on them. However, after the gasket is assembled, since the outer configuration of the gasket is substantially the same in all the gaskets, it is very difficult to recognize the plate used in the gasket or identify the gasket, because the plate to be changed is not seen well from outside, i.e. sandwiched between upper and lower plates.

In U.S. Pat. No. 4,648,607, a steel laminate gasket with assembly order identification device is disclosed, wherein each plate is provided with specific projections. In case the projections align in a specific order, the order of assembly is correct. Therefore, assembly order can be identified by checking the projections after the gasket is assembled.

However, in this patent, the respective plates must have the projections to identify the plates. Since the respective plates have different projections, different cutting devices are required for preparing the respective plates. Therefore, this method is not proper or practical.

In Japanese Patent Publication (KOKAI) No. 3-255275 published on Nov. 14, 1991, a gasket includes a plurality of metal plates, and checking sections formed on the metal plates, number of which is equal to that of the metal plates. Lights are emitted to the respective checking sections to ascertain the order of the assembly of the plates.

In Japanese Utility Model Publication (KOKAI) No. 1-165857 published in 1989, a gasket is formed of a sheet material with a desired thickness and a combination plate with a fixed thickness. The sheet material includes one or more notches based on a thickness of the sheet material. The number of the notches can be seen through one large notch formed on the combination plate when the sheet material and the combination plate are assembled.

In the above Japanese Utility Model publication, a kind of a gasket can be recognized by watching the gasket. However, there has not been proposed to easily identify a kind of a gasket by an automatic mechanical system.

Accordingly, one object of the invention is to provide a method of automatically identifying a kind or a thickness of a metal laminate gasket.

Another object of the invention is to provide a method as stated above, which can be easily performed without using sophisticated mechanism.

A further object of the invention is to provide a metal laminate gasket, which can be easily identified by a mechanical method after the gasket is assembled.

A still further object of the invention is to provide a metal laminate gasket as stated above, which can be manufactured easily and economically.

Further objects and advantages of the invention will be apparent from the following description of the invention.

SUMMARY OF THE INVENTION

In accordance with the present invention, a kind or a thickness of a metal laminate gasket is easily identified. In the method, a specific metal laminate gasket with a plate information device and a checking device are prepared, by which the kind or the thickness of the gasket is identified.

The metal laminate gasket is formed of at least one first metal plate and at least one second metal plate situated under the first metal plate. The first plate includes at least one plate information area, preferably a plurality of plate information areas arranged adjacent to each other on the first plate. The plate information areas is in a form of a hole or a notch.

The second plate includes at least one plate information sign, preferably a plurality of plate information signs situated adjacent to each other. When the first and second plates are assembled, the plate information sign is located exactly under the plate information area of the first plate.

The checking device to be used in the method includes at least one pin, preferably a plurality of pins arranged adjacent to each other, to correspond to the plate information area and the plate information sign.

In the present invention, several kinds of the second plates with different thicknesses are prepared. The second plates with the same thickness have the same plate information sign, but the second plates with different thicknesses have a different plate information sign.

In the invention, several kinds of the second plates with different thicknesses are assembled with the first plates, so that a plurality of gaskets with the same outer configurations but different thicknesses is prepared. In the invention, however, since the second plates with the different thicknesses have different plate information signs, the gaskets with different thicknesses can be easily identified.

In the method of identifying the gasket of the invention, the checking device is disposed on the plate information areas of the first plate. Then, the pin of the checking device is situated inside the hole or notch of the plate information area, and is pushed to abut against or pass through the plate information sign of the second plate. The pin indicates the plate information sign of the second plate to identify the gasket.

The plate information sign of the second plate is a blocking portion or a non-blocking portion. The pin of the checking device can pass through the non-blocking portion but is blocked by the blocking portion. Since the arrangement of the blocking portion and the non-blocking portion is different according to a kind or a thickness of the second plate, identification of the gasket is shown by the condition of the pin entering into the plate information sign.

For example, in case the checking device has three pins and the gasket has the second plate with two non-blocking portions and one blocking portion, two pins pass through the non-blocking portions of the second plate. In another gasket having the second plate with three non-blocking portions, three pins pass through the non-blocking portions. Therefore, although the plate information signs of the second plate is not seen from outside the gasket, the kind of the second plate or the gasket can be easily identified.

Therefore, although the gaskets have the same outer shapes with different thicknesses, the gasket or the second plate can be easily identified by the checking device.

In the method of the invention, the pin is blocked by the blocking portion of the second plate. When the second plate blocks the pin, a relatively large force is applied to the second plate, so that the second plate may be deformed by the pin.

In order to prevent damage of the second plate, in the gasket of the present invention, the plate information area is formed to be a hole or a notch. Namely, each plate information area completely or at least partly surrounds and supports each plate information sign. Accordingly, the second plate is not damaged by the pins.

In this respect, in case each plate information area does not support each plate information sign, the plate information sign or the second plate may be damaged. Especially, if there are two blocking portions adjacent to each other, the blocking portions are pushed by two pins, so that the second plate may be deformed and damaged, which affects the sealing ability of the gasket.

In the present invention, the first plate includes one or more plate information area corresponding to the plate information signs and supports and surrounds the same. Therefore, the second plate is not damaged at all. In the present invention, the thickness of the gasket can be easily identified by the mechanical checking device.

DETAILED DESCRIPTION OF PREFERRED EMBODIMENTS

Figure 1:
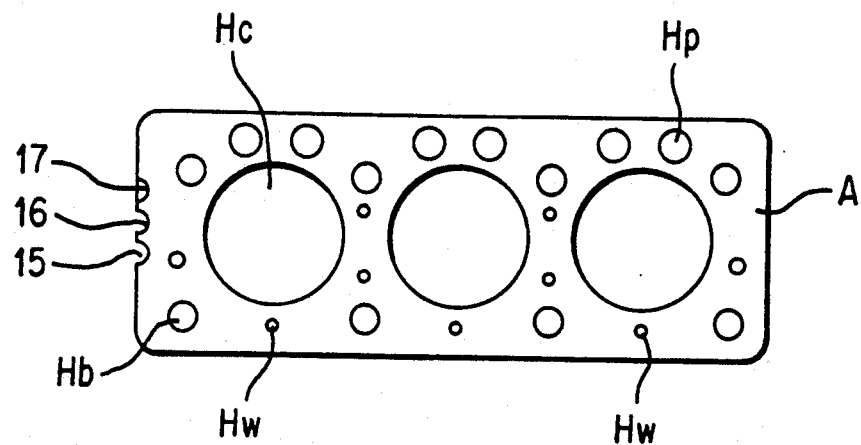
FIG. 1 is a plan view of a metal laminate gasket with a plate information device of the invention.
Figure 2:
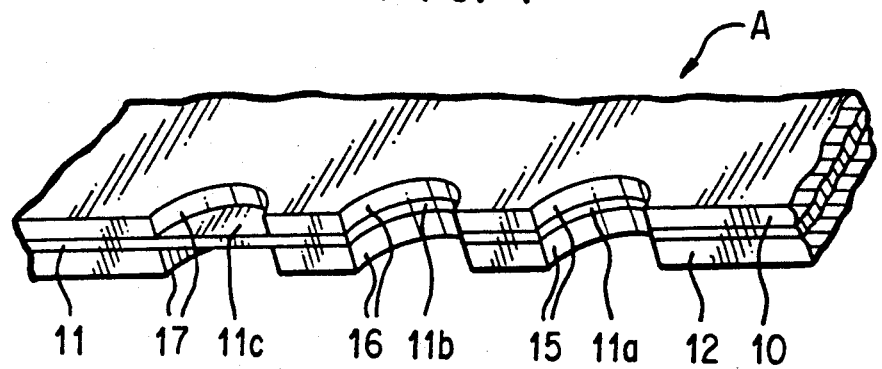
FIG. 2 is an enlarged perspective view for showing the plate information device.
Figure 3:
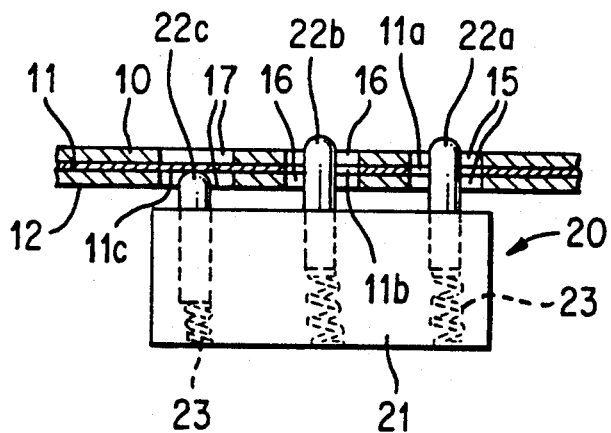
FIG. 3 is an explanatory section view for showing that the thickness of the gasket is identified by a checking device.

Referring to FIGS. 1-3, a first embodiment A of a metal laminate gasket of the invention is shown. The gasket A is a cylinder head gasket and is provided with cylinder bores Hc, water holes Hw, push rod holes Hp and bolt holes Hb, as in the conventional gasket.

Sealing devices are formed around the cylinder bores Hc, the water holes Hw and the push rod holes Hp. However, since the sealing devices are not the subject matter of the present invention, the sealing devices are not shown in the drawings. Any kind of sealing devices may be used.

As shown in FIGS. 2 and 3, the gasket A comprises an upper plate 10, a middle plate 11 and a lower plate 12. The outer configurations of the plates 10-12 are substantially the same as those of a cylinder head and a cylinder block (both not shown). Therefore, when the gasket A is installed between the cylinder head and the cylinder block, the gasket does not project outwardly from the cylinder head and cylinder block.

The plates 10, 12 are exactly the same shape and have three notches 15, 16, 17, respectively, at the side portions thereof where sealing ability of the gasket A is not affected. The notches 15, 16, 17 constitute plate information areas.

The plate 11 is provided with two dents 11a, 11b, which are located at areas where the notches 15, 16 are positioned when the gasket A is assembled. There is no dent in the plate 11 at a blocking portion 11c corresponding to the notch 17. The dents 11a, 11b and the blocking portion 11c constitute plate information signs for the plate 11.

In the gasket A, the plate 11 is used for adjusting the thickness of the gasket A. Therefore, when the thickness of the gasket A is changed, the plate 11 is replaced by a different plate which has different plate information signs. The sign is located at portions corresponding to the notches 15, 16, 17.

The signs on the plate 11 can be seen through the notches 15, 16, 17. However, in the present invention, a checking device 20 is used to mechanically identify the sign of the plate 11.

The checking device 20 is formed of a casing 21 and three pins 22a, 22b, 22c urged outwardly by springs 23. The pins are arranged side by side at predetermined intervals and can be retracted when pushed.

When the thickness of the gasket A is identified, the checking device 20 is disposed on the plate 10 or 12 so that the pins 22a, 22b, 22c can enter into the notches 15, 16, 17. When the checking device 20 is placed under the plate 12 as shown in FIG. 3, the pins 22a, 22b pass through the notches 15, 16, but the pin 22c does not pass through the notch 17 because of the blocking portion 11c.

The pins 22a, 22b can be seen from a side of the plate 10, but the pin 22c can not be seen from the side of the plate 10. The combination of the pins visible from the side of the plate 10 is the identification sign of the gasket A.

In case the plate 11 is replaced by a different plate, such different plate includes a different sign, such as having all notches. In this case, when the checking device 20 is applied to the gasket, a different identification sign, i.e. three pins, is seen. As a result, the plate 11 or the gasket can be easily identified.

In the gasket A, the notches 15-17 are formed to surround the dents 11a, 11b and the blocking portion 11c. In this respect, if one large notch is formed on the plates 10, 12 and two or three pins push the plate 11 inside the large notch, the plate II may be deformed by the pins. If there is a hole near the notch, such deformation may cause leakage of fluid.

In the present invention, in order to prevent possibility of leakage of fluid, the notches 15-17 are formed independently in the plates 10, 12, and the blocking portion 11c must be supported therearound by the plates 10, 12.

Figure 4:
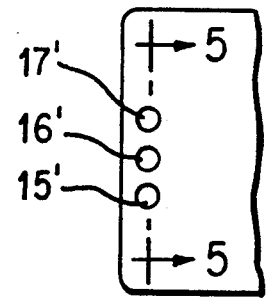
FIG. 4 is an explanatory plan view of a part of a different metal laminate gasket with a plate information device.
Figure 5:
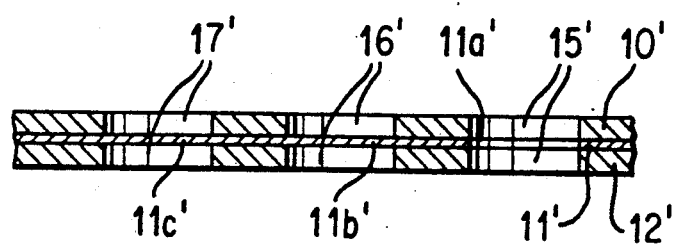
FIG. 5 is an enlarged section view taken along a line 5—5 in FIG. 4.

FIGS. 4 and 5 show a second embodiment B of the present invention. The gasket B is formed of three plates 10', 11', 12', similar to the gasket A. However, the plate 10'-12' have holes 15', 16', 17' inside the gasket B, and the plate 11' has one hole 11a' and two blocking portions 11b', 11c'.

When the checking device 20 is disposed under the plate 12', the pin 22a passes through the hole 15', but the pins 22b, 22c do not pass through the holes 16', 17'. The pin 22a can be seen from the side of the plate 10', but the pins 22b, 22c are not seen. The gasket B shows the signs different from those of the gasket A, so that the gaskets can be identified by the checking device 20.

In the present invention, a plate which may be changed when the thickness of a gasket is altered is provided with plate at least one information sign, and the other plates are provided with at least one notch or hole to support and surround the plate information sign. The plate information sign can be identified by the checking device and is not damaged by the checking device. When the plates are assembled, the plate with the plate information sign can be identified.

In the present invention, at least one notch or hole is formed inside the plate. Namely, none of the portions of the gasket need not project outwardly when the gasket is installed in an engine. Therefore, the gasket does not hinder installation of other parts of a car.

Further, the plates have the same outer configuration, and the notch or hole is formed in the plates. Therefore, it is possible to use the same cutting device for cutting the plates. As a result, the gasket can be manufactured economically.

While the invention has been explained with reference to the specific embodiments of the invention, the explanation is illustrative, and the invention is limited only by the appended claims.

What is claimed is:

1. A method of identifying thickness of a metal laminate gasket, comprising:
   preparing a metal laminate gasket including at least one first metal plate having at least one plate information area in a form of a hole or a notch, said plate information area being formed inside the first plate without extending outside of engine parts; and at least one second metal plate having a certain thickness and situated under the first metal plate to constitute the metal laminate gasket together with the first metal plate, said second metal plate having at least one plate information sign inside the second plate, said plate information sign, when the first and second plates are assembled together, being located exactly under the plate information area of the first plate,
   preparing a checking device having at least one pin to correspond to the plate information area, and
   disposing the checking device on the plate information area of the first plate so that the pin of the checking device is situated inside the plate information area of the first plate and indicates the plate information sign of the second plate to thereby identify the gasket.

2. A method according to claim 1, wherein a plurality of said plate information areas, said plate information signs and pins are formed to be arranged adjacent to each other, respectively, said plate information signs being disposed to align with the plate information areas so that the pins passing through the plate information areas indicate conditions of the plate information signs.

3. A method according to claim 2, wherein said plate information sign of the second metal plate is a blocking portion or a non-blocking portion, said pins passing through the plate information areas of the first plate and contacting the plate information signs to indicate a kind of the plate information signs.

4. A method according to claim 3, wherein said gasket is formed of two first metal plates and one second metal plate situated between the first metal plates, each plate information sign being surrounded and supported by at least three sides of the first metal plates so that when the pin pushes the blocking portion of the plate information sign, the blocking portion is not affected by pushing force of the pin.

5. A method according to claim 4, wherein said pin passes through the non-blocking portion of the plate information sign in case the non-blocking portion is aligned with the plate information area, and the pin abuts against the blocking portion of the plate information sign in case the blocking portion is aligned with the plate information area.

6. A method according to claim 2, whereby in the preparation of said gasket a third metal plate having a thickness different from that of the second metal plate and a plurality of plate information signs at portions corresponding to the plate information areas is substituted for the second metal plate, said plate information signs on the third plate being different from those on the second plate, said checking device indicating the difference in thickness between the second and third plates.

7. A metal laminate gasket for an internal combustion engine adapted to be identified by a checking device with pins, comprising,
   first and second metal plates having a plurality of plate information areas, each being in a form of a hole or a notch, said plate information areas of the first and second metal plates being arranged adjacent to each other inside the respective plates, and
   at least one third metal plate having a certain thickness and situated between the first and second metal plates to constitute the metal laminate gasket, said third metal plate having a plurality of plate information signs situated adjacent to each other, said plate information signs, when the gasket is assembled together, being aligned exactly with the plate information areas of the first and second plates, each plate information sign being in a form of a blocking portion or a hole and being surrounded and supported by at least three sides of the first and second metal plates so that when the pin of the checking device pushes the blocking portion of the plate information sign through the plate information area, the blocking portion of the third plate is not affected by pushing force of the pin, said pins of the checking device indicating the plate information signs of the third plate to thereby identify the gasket.

8. A gasket according to claim 7, wherein said third plate may have different thicknesses, said plate information signs, on the third plate being different according to the thickness of the third plate, said checking device indicating difference in thickness.

* * * * *